Patented Oct. 31, 1950

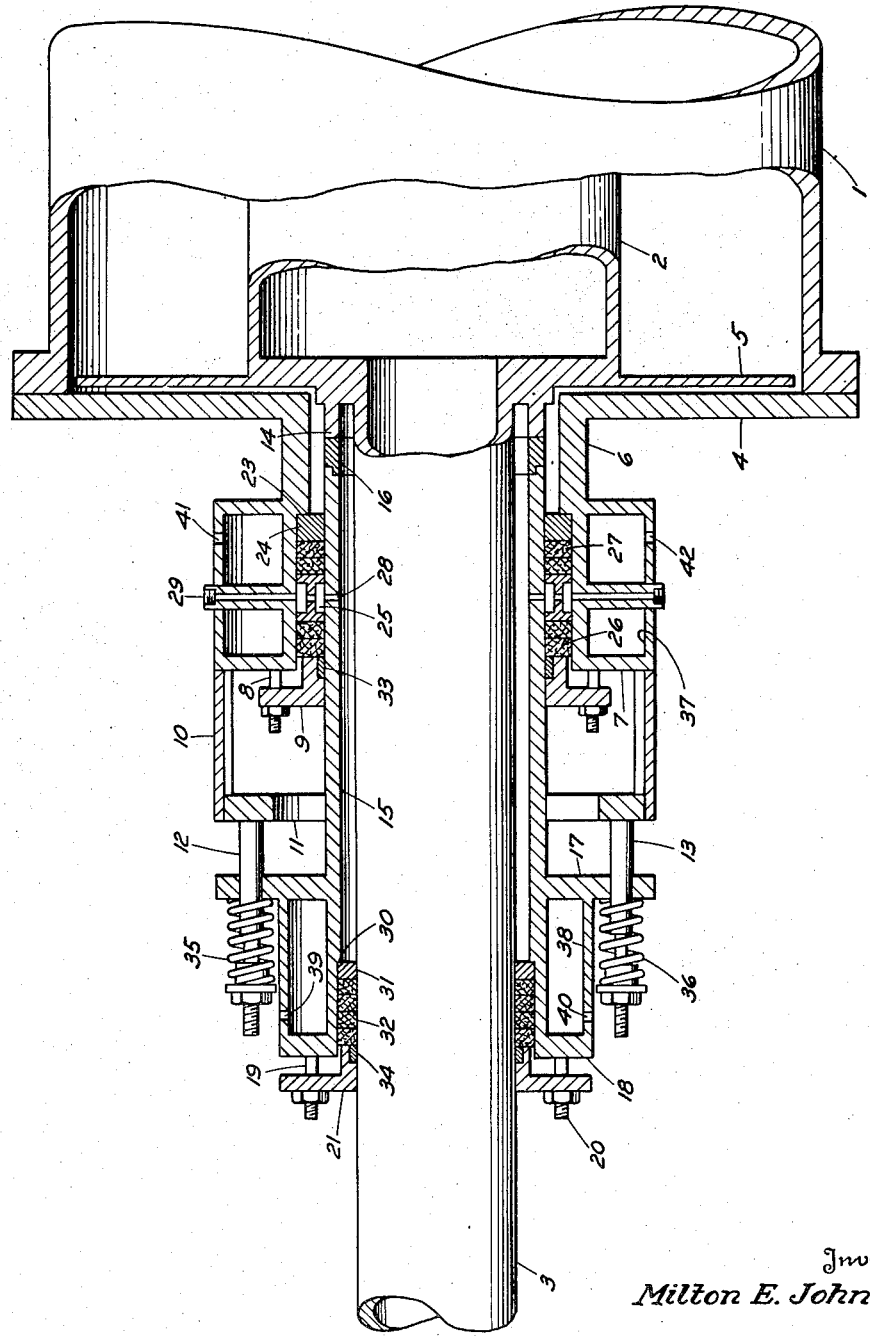

2,528,436

UNITED STATES PATENT OFFICE 2,528,436

STUFFING BOX AND EXPANSION JOINT

Milton E. Johnson, Prospect Park, Pa., assignor to the United States of America as represented by the United States Atomic Energy Commission Application April 25, 1946, Serial No. 664,749

1 Claim. (Cl. 286—9)

This invention relates to gas seals for retorts containing rotating shafts and is particularly directed to improvements in stuffing boxes and expansion joint assemblies for use in such apparatus.

In the manufacture of certain organic compounds by reaction of highly active solids with organic gases or vapors, the reaction itself and the regeneration of the solid reagent by active gases are conducted in a horizontal chamber or reaction vessel provided with a hollow rotating shaft through which a cooling medium is circulated and upon which agitators for the solid are mounted. The apparatus is subject to high temperatures and its large size necessitates special provision for expansion and consequent displacement of the shaft with respect to the reactor. This is an especially serious problem if the reactor becomes hotter on one side than on another. Simple stuffing boxes are inadequate because they are incapable of functioning satisfactorily under the conditions of expansion and contraction and resulting misalignment involved and because the solids, gases and vapors attack and rapidly destroy ordinary packing materials.

It is an object of the present invention to provide a stuffing box and expansion joint assembly for a reactor shaft arranged so as to permit longitudinal expansion and resulting misalignment of the reactor without interfering with rotation of the shaft or disturbing the gas-tightness of the stuffing box. A further object of the invention is the provision of means for blanketing the stuffing box and protecting it from the deleterious action of gases and dust present in the reactor. Further objects of the invention will be apparent from the following description thereof and illustrations of its specific application.

In the apparatus of the invention a stationary floating cylinder is provided between the shaft and the end of the reactor through which the shaft passes. The shaft is provided with an external thrust bearing surface within the reactor housing and the floating cylinder is provided with a cooperating thrust bearing at one end. The floating cylinder is supported by the housing and is held by means of longitudinally reacting springs so that its bearing is maintained in firm contact with the thrust bearing surface of the shaft. At the opposite end of the floating cylinder a packed gland is provided between the cylinder and shaft. Between the thrust bearing pair and the aforementioned packed gland a second packed gland is provided between the cylinder and housing. This second packed gland is split circumferentially to provide an annular gas space into which one or more holes in the cylinder open and which is connected with a gas inlet pipe so that an inert gas such as nitrogen may be passed into the space between the cylinder and shaft to form an inert gas blanket which protects the first packed gland from the corrosive action of gases and vapors in the reactor.

The trust-bearing surfaces of the floating cylinder and shaft form a seal which prevents any substantial quantity of dust from entering the space between the cylinder and shaft and at the same time prevents substantial diffusion of the reaction gases into the inert gas space. In this way it is possible to maintain adequate protection for the stuffing box with the introduction of only small quantities of inert gas. This not only effects a substantial reduction in dilution of the contents of the retort by this sealant gas but also reduces the cost of sealant gas for accomplishing the intended purpose.

Because of the resilience afforded by the floating cylinder construction, very substantial longitudinal displacement and considerable misalignment of the reactor and shaft may occur without serious interference with the effective functioning of the stuffing box and protective assembly.

The nature of the invention will be more readily apparent from the following detailed description of the specific embodiment thereof illustrated in the accompanying drawing, which shows partly in section a fragmentary view of a reactor and shaft assembly and a stuffing box and expansion joint assembly designed in accordance with the teachings of the invention.

In the drawing the numeral 1 designates a reactor, which may be a horizontal tubular chamber of circular cross section or other form suitable for the particular application involved. The reactor is provided with a rotating member 2 supported on a shaft 3. Both of these members are shown in the drawing as hollow elements for the passage of a gas through them. The rotating element 2 and the shaft 3 are supported by main bearings outside the limits of the drawing and forming no part of the invention. Reactor 1 is provided with an end plate or wall 4 which constitutes the support for the stuffing box assembly. At the juncture of the element 2 and shaft 3 a disc 5 is disposed close to the end-plate 4. This disc 5 serves as added protection for the stuffing box assembly by reducing the circulation of material in reactor 1 into the vicinity of the stuffing box. Extending from and forming part of end-plate 4 is a cylindrical projection 6 providing a housing coaxially disposed with respect to shaft 3. Housing 6 is provided with an annular flange 7 at the end remote from the plate 4. Fixed in flange 7 are a plurality of stud bolts 8 which carry a compression ring 9. Extending from the outer edge of flange 7 are a number of arms 10 supporting an annulus 11. Annulus 11 carries a plurality of stud bolts 12, 13, etc. Near the junction of plate 4 and housing 6, shaft 3 is provided with a shoulder forming a thrust-bearing 14 having its bearing surface normal to the axis of the shaft. Mounted on stud bolts 12, 13, etc., is a floating cylinder 15. Cylinder 15 abuts the bearing 14 and is provided with a ring 16 of softer metal to form the bearing and wearing surface. Ring 16 may be composed of bronze when the mating bearing 14 is steel and may be fixed to the cylinder 15 by a brazed union. Cylinder 15 is supported on stud bolts 12, 13, etc. by an annular flange 17. The cylinder at its end remote from the bearing ring 16 has an annular flange 18 supporting stud bolts 19, 20, etc. These bolts carry a second compression ring 21.

The housing 6 is constructed to provide an interior shoulder 23 which serves as a seat for a thrust ring 24. Between the thrust ring 24 and the compression ring 9 an "H" ring 25 is provided between two sets of packing rings 26 and 27. The "H" ring is provided with a series of apertures through its bridge and is positioned so that gas can pass freely between apertures 28 in cylinder 15 and gas connections 29 in housing 6. It thus forms with housing 15 a tuyère for distributing gas around shaft 3. The cylinder 15 is provided with a shoulder 30 for supporting a thrust ring 31 cooperating with compression ring 21 to form a packed gland filled with suitable packing material 32. Compression rings 9 and 21 are provided with bushings 33 and 34 of softer metal than shaft 3 to avoid scoring of the shaft surface by the compression rings and to insure accurate alignment of these rings on the shaft. Stud bolts 12 and 13 are provided with suitable compression springs 35, 36, etc. bearing on the flange 17 and adapted for maintaining constant the pressure of cylinder 15 against thrust bearing 14. Housings 37 and 38 are arranged immediately outside the two packed glands for circulating a cooling fluid in heat transfer relationship with the glands to protect the packing from the deleterious influences of heat and are provided with suitable ports 39 to 42 for flow of the cooling fluid into and out of the housings.

In operation of the assembly, nitrogen or other inert gas is introduced at one or more of the connections 29 to fill the space between shaft 3 and cylinder 15 with inert gas; cooling fluid is circulated through the housings 37 and 38 to maintain the packed glands cool; and the reactor is brought to operating temperature and placed in operation. Any expansion of the element 2 resulting in displacement of bearing 14 is compensated by corresponding motion of cylinder 15 made possible by the resilience of springs 35, 36, etc. Thus the relative position of the packed gland formed by compression ring 21 and its thrust-ring 30 remains constant with respect to shaft 3, and the constant thrust of the cylinder against bearing 14 maintains a snug fit at this point and prevents escape of excessive quantities of inert gas. Loss of inert gas to the atmosphere or directly to the interior of the reactor is prevented by the sets of packing rings 26 and 27.

It will be understood that I intend to include variations and modifications of the invention and that the preceding examples are illustrations only and in no wise to be construed as limitations upon the invention, the scope of which is defined in the appended claim, wherein I claim:

A stuffing box and expansion joint assembly for a shaft passing through at least one wall of a chamber, comprising a floating cylinder between and spaced from the shaft and the chamber wall and having a bearing at one end abutting a thrust bearing surface on the shaft, means for yieldably compressing the cylinder bearing against said bearing surface, a packed gland between the shaft and the cylinder, longitudinally remote from said bearing surface, and a second packed gland between the cylinder and the chamber wall, longitudinally intermediate between the first packed gland and the cylinder bearing, and means for introducing an inert gas into the cylinder, said means comprising a spacer ring in the second packed gland, apertures in the spacer ring and cooperating apertures in the cylinder and housing, and packing material on both sides of the spacer ring for preventing escape of gas from said ring directly into the chamber and into the surrounding atmosphere.

MILTON E. JOHNSON.

REFERENCES CITED

The following references are of record in the file of this patent:

UNITED STATES PATENTS

| Number | Name | Date |
|---|---|---|
| 1,198,856 | Lachmann | Sept. 19, 1916 |
| 1,898,278 | Weis | Feb. 21, 1933 |
| 2,297,302 | Hornschuch | Sept. 29, 1942 |

FOREIGN PATENTS

| Number | Country | Date |
|---|---|---|
| 24,955 | Great Britain | of 1906 |